United States Patent
Fortman (12)

(10) Patent No.: US 6,203,192 B1
(45) Date of Patent: Mar. 20, 2001

(54) SYSTEM AND METHOD FOR AUTOMATICALLY DELIVERING MESSAGES TO A TELECOMMUNICATIONS DEVICE

(75) Inventor: Peter A. Fortman, Raleigh, NC (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 08/998,222

(22) Filed: Dec. 24, 1997

Related U.S. Application Data

(63) Continuation-in-part of application No. 08/841,516, filed on Apr. 23, 1997, now Pat. No. 5,987,100.

(51) Int. Cl.⁷ .................................................. H04M 1/64
(52) U.S. Cl. ..................... 374/88.14; 379/88.14; 379/88.22; 379/106.09
(58) Field of Search ................................ 379/67.1, 88.06, 379/88.11, 88.12, 88.13, 88.14, 88.19, 88.2, 88.21, 88.22, 88.25, 106.09, 142, 201

(56) References Cited

U.S. PATENT DOCUMENTS

| | | | |
|---|---|---|---|
| 4,902,881 | 2/1990 | Janku | 235/381 |
| 5,033,077 | 7/1991 | Bergeron et al. | 379/367 |
| 5,138,653 | 8/1992 | Le Clercq | 379/96 |
| 5,339,156 | 8/1994 | Ishii | 358/402 |
| 5,351,276 | 9/1994 | Doll, Jr. et al. | 379/67 |
| 5,381,466 | * 1/1995 | Shibayama et al. | 379/88 |
| 5,416,831 | 5/1995 | Chewning, III et al. | 379/96 |
| 5,475,738 | * 12/1995 | Penzias | 379/67 |
| 5,479,408 | 12/1995 | Will | 370/94.1 |
| 5,479,411 | * 12/1995 | Klein | 379/88 |
| 5,483,352 | 1/1996 | Fukuyama et al. | 358/402 |
| 5,497,373 | 3/1996 | Hulen et al. | 370/79 |
| 5,500,893 | 3/1996 | Onosaka | 379/396 |
| 5,524,137 | * 6/1996 | Rhee | 379/67 |
| 5,717,742 | * 2/1998 | Hyde-Thomson | 379/88 |
| 5,781,614 | * 7/1998 | Brunson | 379/88 |
| 5,822,404 | * 10/1998 | Cave | 379/67 |
| 5,870,454 | * 2/1999 | Dahlen | 379/88.14 |
| 5,987,100 | * 11/1999 | Fortman et al. | 379/88.14 |
| 5,999,594 | * 1/1995 | Mizoguchi et al. | 379/88.14 |

FOREIGN PATENT DOCUMENTS

WO 87/07801   12/1987   (WO) .

OTHER PUBLICATIONS

Philips Consumer Communications, "Screen Phones," pp. 1–3, 1997, HTTP://www.pcc.philips.com/base/viewscreen-phones?typeno=DS+200.

Philips, "Press Releases Archive," pps. 1–2, Jan. 9, 1997, HTTP://www.new.philips.com/archief/199701092.html.

* cited by examiner

*Primary Examiner*—Scott L. Weaver
(74) *Attorney, Agent, or Firm*—Finnegan, Henderson, Farabow, Garrett & Dunner, L.L.P.

(57) ABSTRACT

A server in a telecommunications network connects to subscriber equipment of at least one type and to caller equipment of several different types via a communications medium. The server includes a receiving element, a translating element, and a routing element. The receiving element receives messages intended for the subscriber equipment from the caller equipment in caller formats. The translating element translates the messages to a subscriber format compatible with the subscriber equipment. The routing element automatically transfers the translated messages to the subscriber equipment without requiring the subscriber to initiate the message transfer.

42 Claims, 7 Drawing Sheets

SYSTEM AND METHOD FOR AUTOMATICALLY DELIVERING MESSAGES TO A TELECOMMUNICATIONS DEVICE

RELATED APPLICATION

This application is a continuation-in-part of U.S. patent application Ser. No. 08/841,516, filed Apr. 23, 1997, now U.S. Pat. No. 5,987,100, which is hereby incorporated by reference.

BACKGROUND OF THE INVENTION

The present invention relates generally to messaging and more particularly to a messaging system and method that automatically transfer messages for display on subscriber equipment.

The trend in the telecommunications industry is toward providing a wide variety of information and communication services, or messaging services, over various communications networks to remote subscribers having diverse analog and digital telecommunications equipment. These messaging services might include voice messaging, facsimile messaging, electronic mail, electronic document interchange, interactive voice response, audio text, speech synthesis, speech recognition, video messaging, video mail, etc.

To provide these messaging services, different types of telecommunications equipment and processing protocols connect to a single host system or messaging center that provides the messaging services. The messaging center performs protocol conversions between the format employed by the messaging center and the various telecommunications formats employed by the diverse subscriber equipment.

Systems that provide messaging services over public voice networks traditionally use hardwired transceiving and protocol conversion equipment dedicated to a particular type of equipment and communications format and protocol. Unfortunately, this approach suffers from high costs and lack of flexibility and adaptability. Disadvantages arise because dedicated hardware cannot be readily modified to increase data throughput or to handle communications protocols from new types of telecommunications equipment or services. Supporting multiple types of messaging services for diverse telecommunications equipment thus requires costly module replacements and new designs for dedicated hardware.

Other systems have proposed digital signal processing and multimedia interfaces to process the communication trunk lines. One such system includes a host messaging center that supports numerous types of messaging applications and performs the necessary protocol conversions for different telecommunications protocols corresponding to various types of telecommunications media. The system uses multiple digital signal processors to perform real-time protocol conversions between the different telecommunication protocols and the protocol of the host messaging center.

All of these systems store pending messages until requested by a subscriber. The subscriber must therefore initiate the retrieval of the stored messages before the system delivers the messages to the subscriber's equipment. The subscriber might initiate message retrieval by dialing a telephone number for the messaging service and following a series of menus to retrieve the pending messages.

As a result, a need has arisen to promptly notify and deliver messages to the subscriber's telecommunications equipment without requiring the subscriber to initiate retrieval of the messages.

SUMMARY OF THE INVENTION

The present invention addresses this need by providing a system and method that automatically translate messages to a format used by a subscriber's telecommunications equipment and deliver the translated messages to the subscriber's telecommunications equipment independent of any action by the subscriber.

In accordance with the purpose of the invention as embodied and broadly described herein, the system, consistent with the principles of the present invention, comprises a receiving element, a translating element, and a routing element.

The receiving element receives messages intended for subscriber equipment from caller equipment in caller formats. The translating element translates the messages to a subscriber format compatible with the subscriber equipment. The routing element automatically transfers the translated messages to the subscriber equipment without requiring the subscriber to initiate the message transfer.

BRIEF DESCRIPTION OF THE DRAWINGS

The accompanying drawings, which are incorporated in and constitute a part of this specification, illustrate an embodiment of the invention and, together with the description, explain the objects, advantages and principles of the invention. In the drawings.

DETAILED DESCRIPTION OF THE PREFERRED EMBODIMENTS

The following detailed description of the invention refers to the accompanying drawings. The same reference numbers in different drawings identify the same or similar elements. Also, the following detailed description does not limit the invention. Instead, the scope of the invention is defined by the appended claims.

In the detailed description that follows, "subscriber" refers to a person that subscribes to the services provided by systems and methods consistent with the principles of the present invention. A subscriber can receive messages from callers and can send messages to other subscribers. A "caller," on the other hand, refers to a person who does not subscribe to the services. A caller's actions are limited to sending messages to subscribers.

Systems and methods consistent with the principles of the present invention receive messages intended for subscribers, translate the messages to a form compatible with the subscribers' telecommunications equipment, and automatically transfer the messages to the subscribers' telecommunications equipment without requiring that the subscribers initiate the transfer process.

I. System Elements

Figure 1:
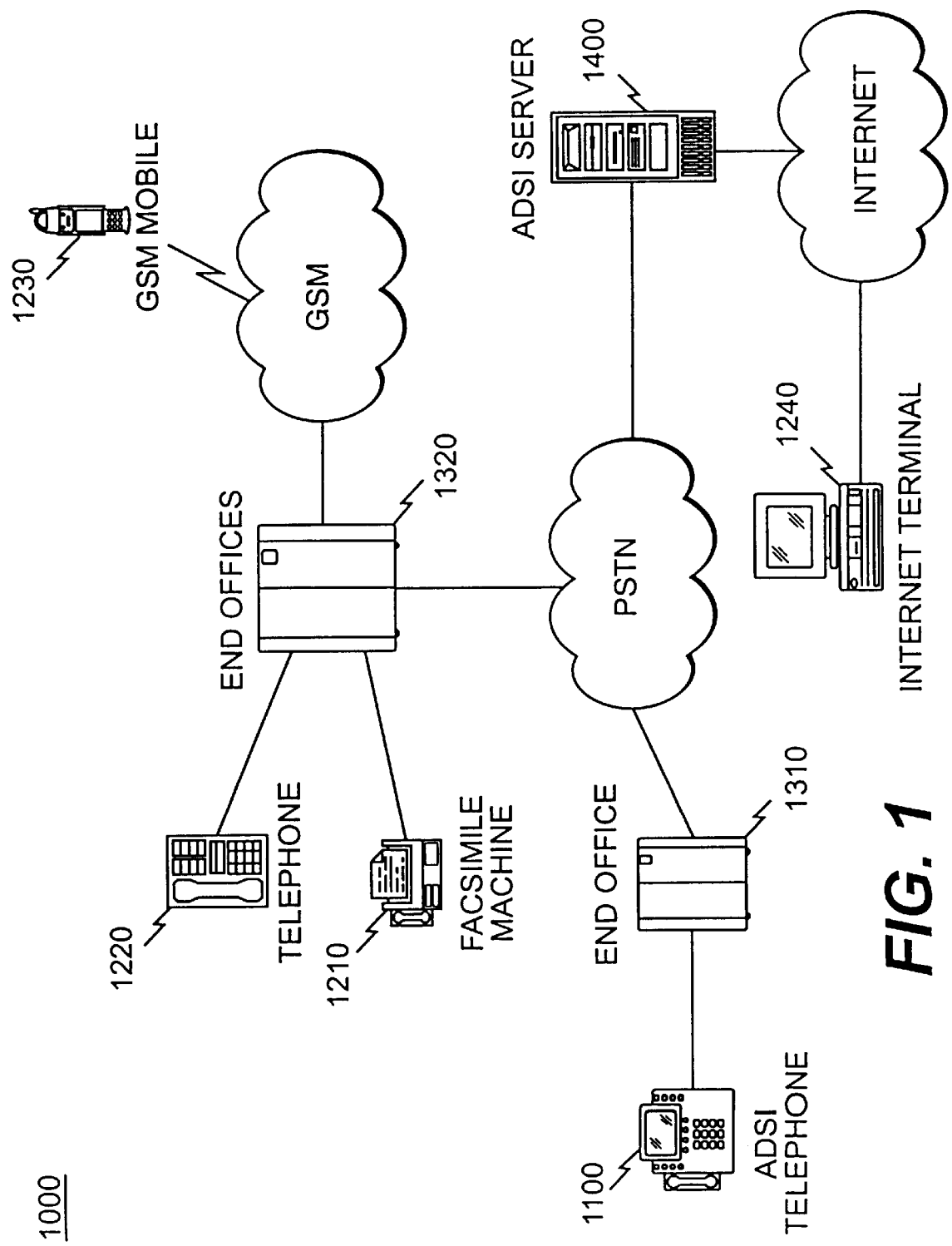
FIG. 1 is a block diagram of a communications network consistent with the principles of the present invention.

FIG. 1 is a block diagram of communications network 1000 in an implementation consistent with the principles of the present invention. A subscriber using, for example, Analog Display Services Interface (ADSI) telephone 1100 receives messages from callers using different types of telecommunications equipment. The caller telecommunications equipment might include group 1, 2, 3, or 4 facsimile machine 1210, Plain Old Telephone System (POTS) or ISDN telephone 1220, Global System for Mobile Communications (GSM) mobile unit 1230, and Internet terminal 1240.

Figure 2:
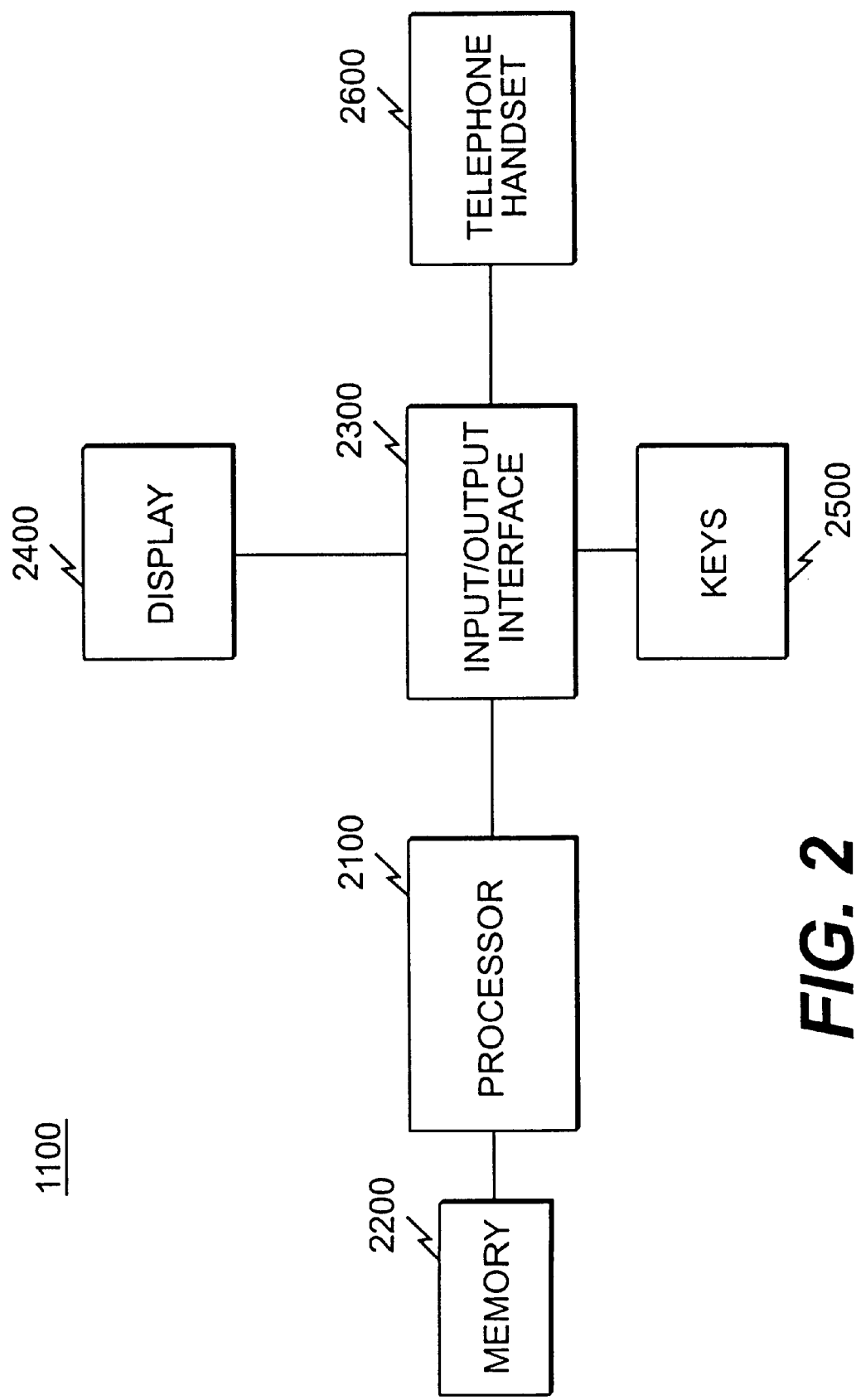
FIG. 2 is a block diagram of the subscriber equipment shown in FIG. 1.

FIG. 2 is a block diagram of ADSI telephone 1100, which includes processor 2100, memory 2200, input/output interface 2300, display 2400, keys 2500, and telephone handset 2600. Processor 2100 is a standard microprocessor that controls operation of ADSI telephone 1100, including the processing of incoming voice calls and text messages. Memory 2200 is a conventional memory device, such as a RAM, that stores incoming voice and text messages.

Input/output interface 2300 connects processor 2100 to input and output devices, such as display 2400, keys 2500, and telephone handset 2600. Display 2400 is a conventional flat screen display, such as an LCD display, that displays information to the subscriber. Keys 2500 include several function keys and regular telephone alphanumeric keys to permit the subscriber to input information and dial telephone numbers. Telephone handset 2600 is a conventional telephone handset that permits the subscriber to make and receive voice calls.

Returning to FIG. 1, end offices 1310 and 1320 connect the subscriber and caller telecommunications equipment, except for Internet terminal 1240, to network 1000. ADSI telephone 1100, group 1, 2, 3 facsimile machine 1210, and POTS telephone 1220 connect to end offices 1310 and 1320 over conventional analog lines. Group 4 facsimile machine 1210 and ISDN telephone 1220 connect over conventional digital lines. GSM mobile unit 1230 connects to end offices 1320 via a GSM network.

End offices 1310 and 1320 are standard Private Branch Exchanges (PBXs) or Class 5 telephone switches that connect to ADSI server 1400 by conventional mechanisms over a public voice network, such as the Public Switched Telephone Network (PSTN). Internet terminal 1240, on the other hand, connects to ADSI server 1400 by conventional mechanisms over a data network, such as the Internet.

ADSI server 1400 includes a computer with conventional connections to various telecommunications networks, such as the PSTN and the Internet, and might include a UNIX-capable computer, such as an HP model or the IBM Risc 6000. ADSI server 1400 translates messages from the callers and presents the translated messages to the subscribers' telecommunications equipment.

Figure 3:
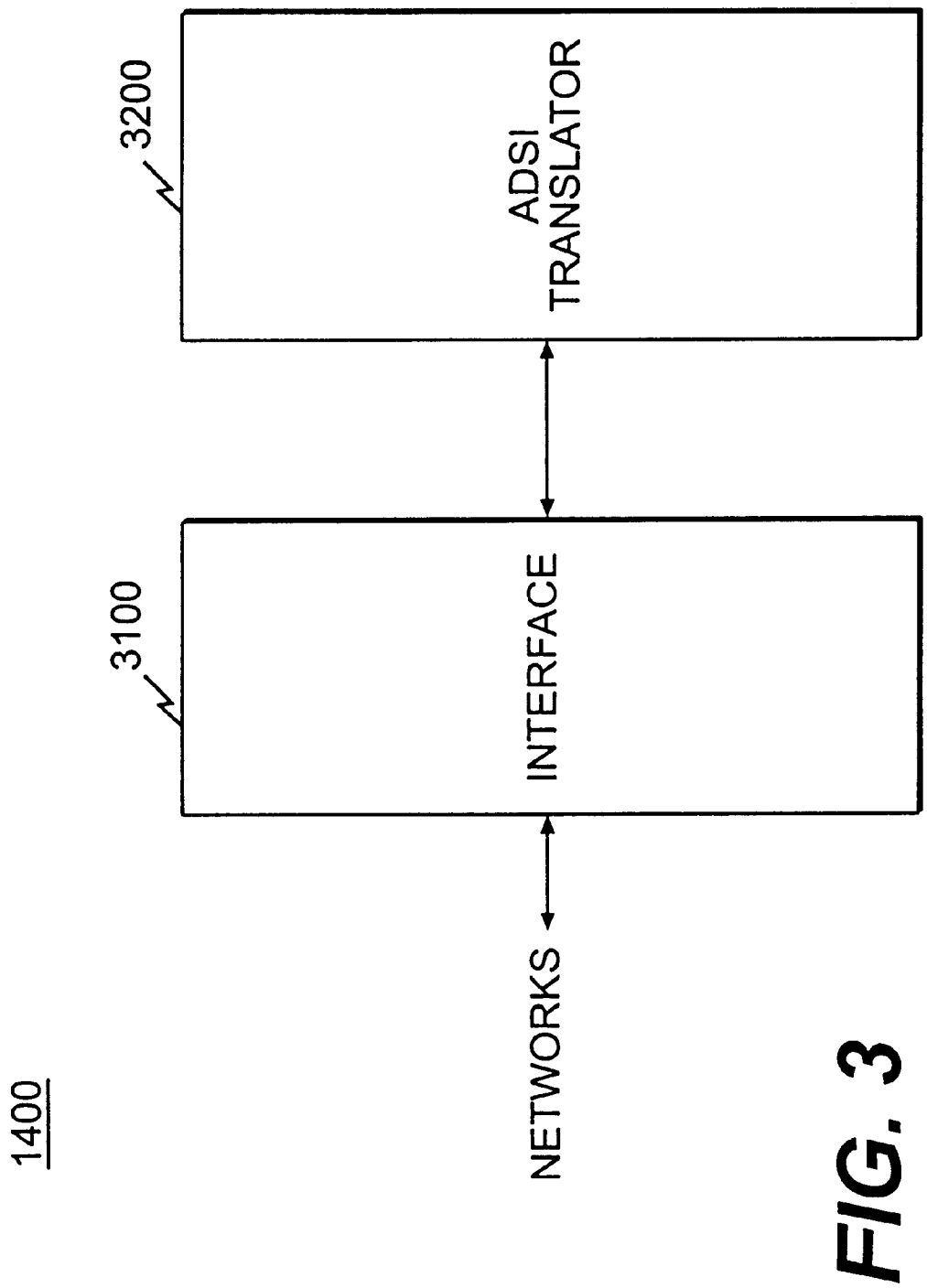
FIG. 3 is a block diagram of elements of the ADSI server shown in FIG. 1.

FIG. 3 is a block diagram of elements of ADSI server 1400 consistent with the principles of the present invention. ADSI server 1400 preferably includes interface 3100 and ADSI translator 3200. Interface 3100 connects ADSI server 1400 to various telecommunications networks, including the PSTN and the Internet.

Figure 4:
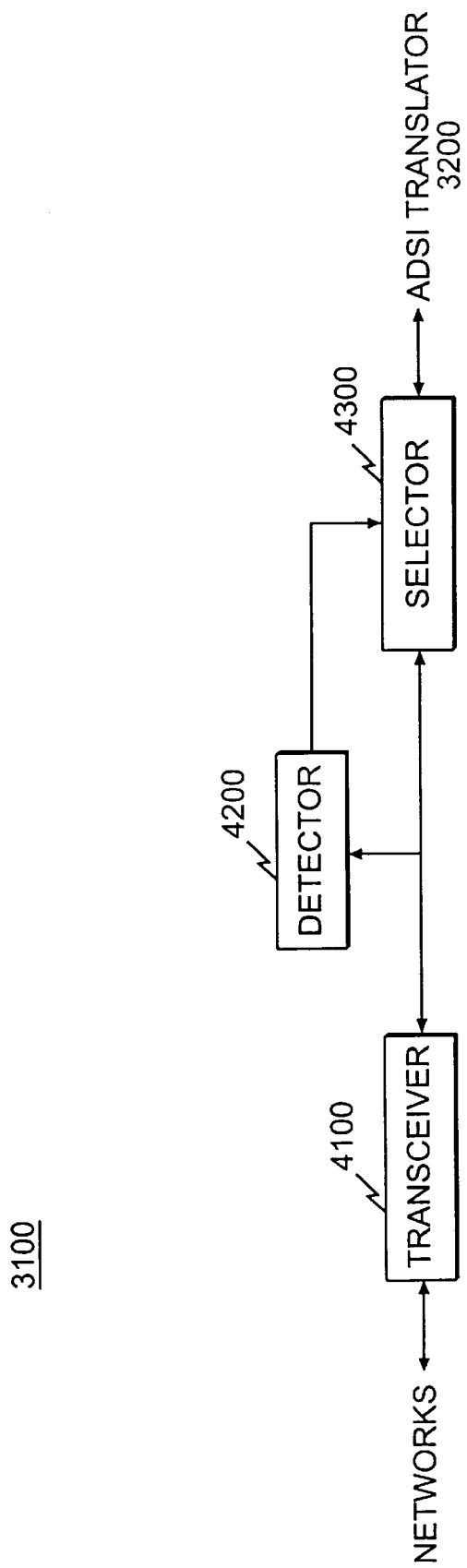
FIG. 4 is a block diagram of elements of the interface shown in FIG. 3.

FIG. 4 is a block diagram of elements of interface 3100, including transceiver 4100, detector 4200, and selector 4300. While FIG. 4 shows only a single transceiver, detector, and selector, interface 3100 actually includes several of these elements for concurrently handling messages from several different callers.

Transceiver 4100 interfaces with the various networks, including the PSTN and the Internet, and exchanges signals with the subscribers' and callers' telecommunications equipment to permit callers to transmit messages to ADSI server 1400, and to permit ADSI server 1400 to forward these messages to the subscribers' telecommunications equipment.

Detector 4200, which preferably includes a conventional signal line detector, detects the type of telecommunications equipment a caller uses based on the type of signal received by transceiver 4100. Detector 4200 sends information indicating the equipment type as a selection signal to selector 4300.

Selector 4300, which includes a conventional selector such as a multiplexer/demultiplexer, routes the caller signals received by transceiver 4100 to ADSI translator 3200 using the selection signal from detector 4200. Selector 4300 also routes messages to the subscribers via transceiver 4100.

Figure 5:
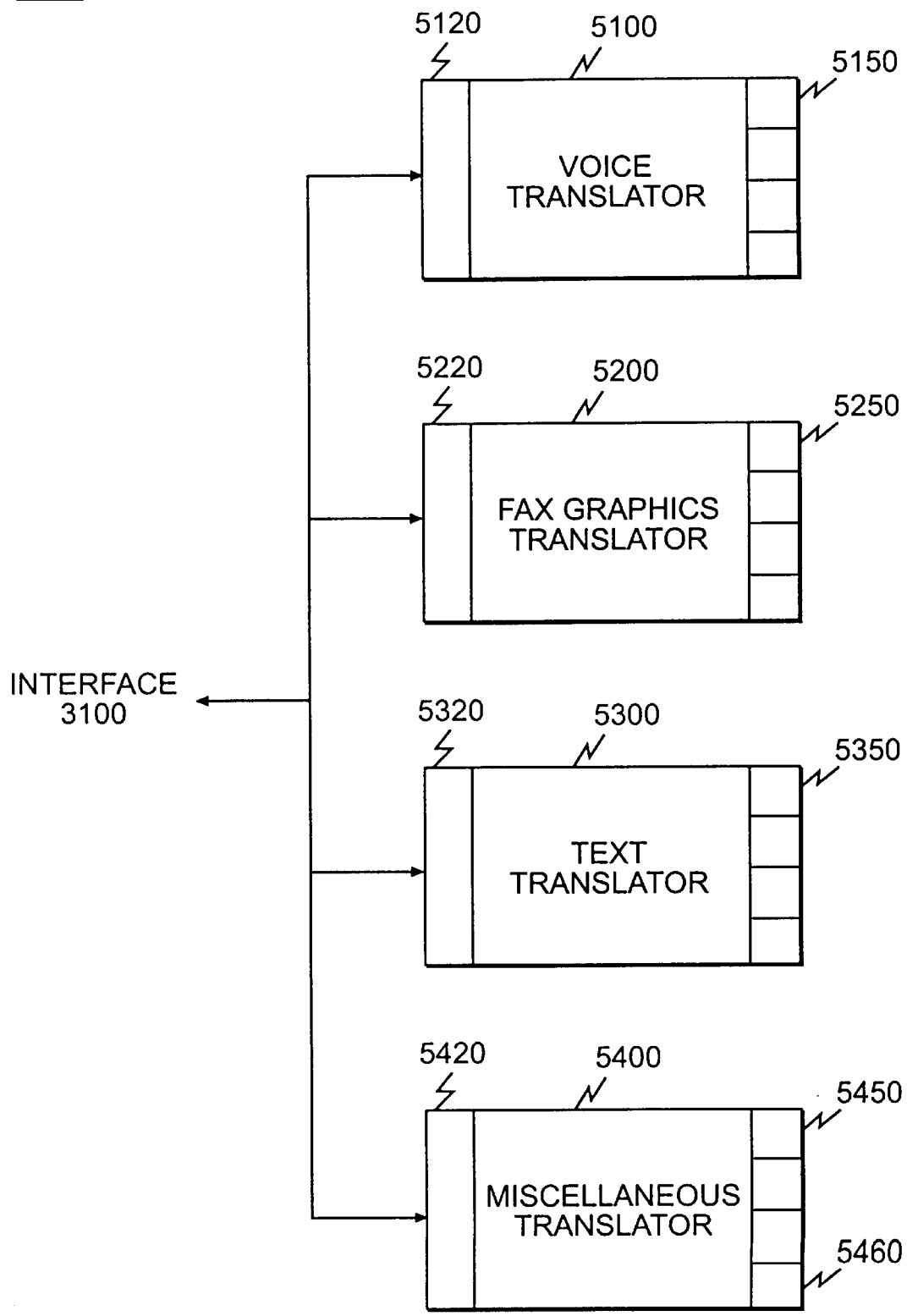
FIG. 5 is a block diagram of elements of the ADSI translator shown in FIG. 3.

Returning to FIG. 3, ADSI translator 3200 connects to interface 3100 and performs message translations from the formats used by the callers' telecommunications equipment to the format compatible with the subscribers' telecommunications equipment, or the ADSI text format, according to the implementation shown in FIG. 1. FIG. 5 is a block diagram of ADSI translator 3200, including voice translator 5100, fax graphics translator 5200, text translator 5300, and miscellaneous translator 5400.

Voice translator 5100 includes controller 5120 and several voice translation units 5150 that translate voice messages to ADSI text format. Upon receipt of a voice call, controller 5120 detects information regarding the caller, such as calling line identification (CLID) data, from the voice call signal by conventional mechanisms, and records the voice message. Controller 5120 then selects one of the voice translation units 5150 to translate the voice message to ADSI text format. The selected voice translation unit 5150 can use conventional translation software to perform this translation.

When the selected voice translation unit 5150 finishes translating the voice message, controller 5120 generates an ADSI text message including the caller information and the translated voice message. Controller 5120 then sends the ADSI text message to interface 3100 for routing to the subscribers' telecommunications equipment.

Fax graphics translator 5200 includes controller 5220 and several fax graphics translation units 5250 that translate fax graphics of fax transmissions to ADSI text format. Upon receipt of a fax transmission, controller 5220 detects information regarding the caller, such as CLID data, from the fax transmission signal by conventional mechanisms, and stores the fax. Controller 5220 then selects one of the fax graphics translation units 5250 to translate fax graphics of the fax to ADSI text format. The selected fax graphics translation unit 5250 can use conventional translation software to perform this translation.

When the selected fax graphics translation unit 5250 finishes translating the fax, controller 5220 generates an ADSI text message including the caller information and the translated fax. Controller 5220 then sends the ADSI text message to interface 3100 for routing to the subscribers' telecommunications equipment.

Similar to voice and fax graphics translators 5100 and 5200, text translator 5300 includes controller 5320 and several text translation units 5350 that translate text messages to ADSI text format. Upon receipt of an email, page, or Short Messaging Service (SMS) message, controller 5320 detects information regarding the caller by conventional mechanisms, and stores the message. Controller 5320 then selects one of the text translation units 5350 to translate the message to ADSI text format. The selected text translation unit 5350 can use conventional translation software to perform this translation.

When the selected text translation unit 5350 finishes translating the message, controller 5320 generates an ADSI text message including the caller information and the translated message. Controller 5320 then sends the ADSI text message to interface 3100 for routing to the subscribers' telecommunications equipment.

Miscellaneous translator 5400 includes controller 5420 and backup translation units 5450 or supplementary translation units 5460 for increased message traffic. Miscellaneous translator 5400 might, additionally or alternatively, include translation units for translating from formats not specifically mentioned herein.

Translators 5100–5400 might also include queuing mechanisms that buffer messages awaiting translation or translated messages waiting to be transferred to the subscribers' telecommunications equipment. In this case, the controllers could buffer translated messages and route them to subscribers' telecommunications equipment after a predetermined period of time or during idle periods.

II. Call Processing

Figure 6:
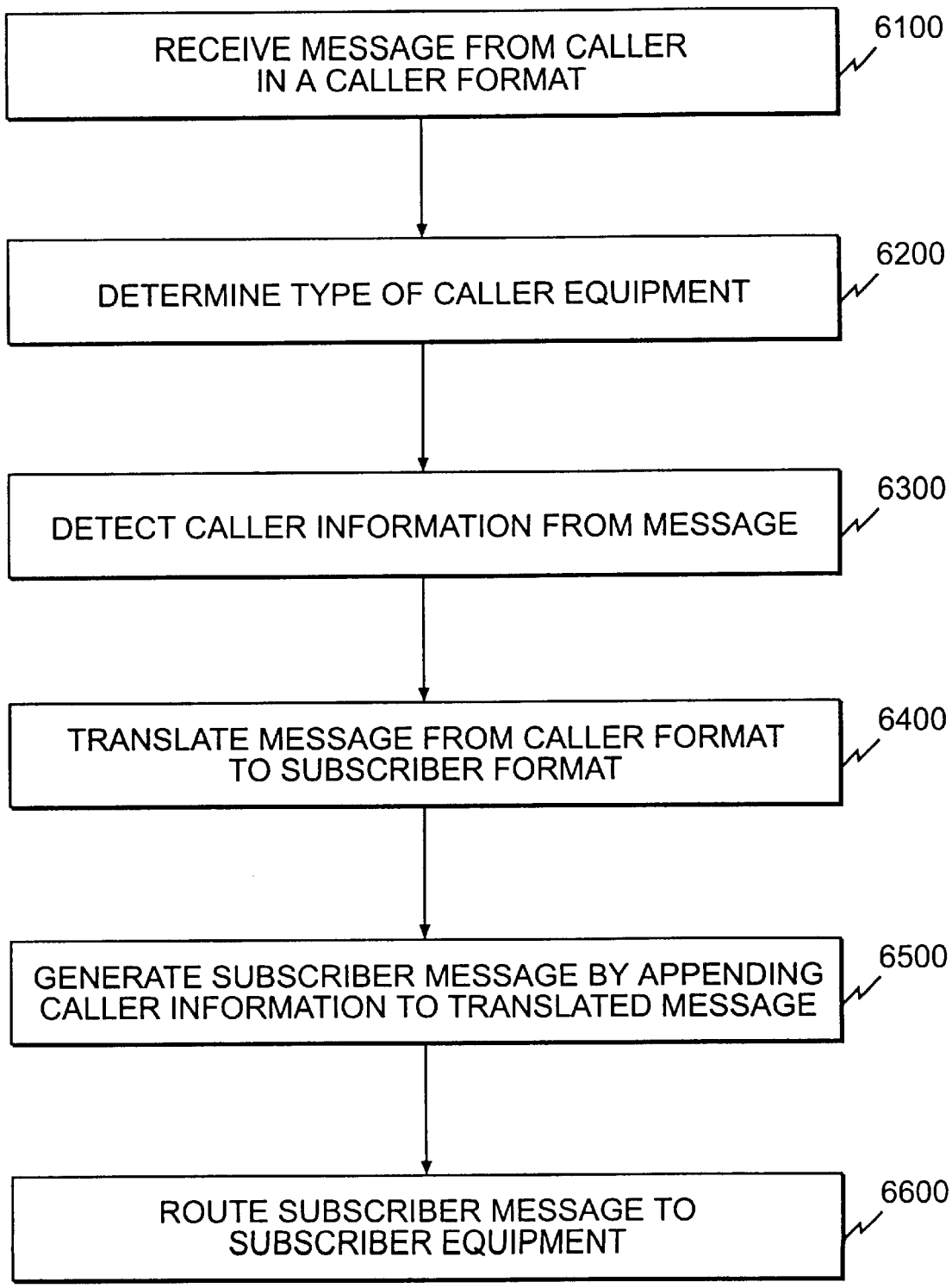
FIG. 6 is a flowchart of call processing operations occurring at the ADSI server in an implementation consistent with the principles of the present invention.

FIG. 6 is a flowchart of call processing operations occurring at ADSI server 1400 (FIG. 3) in an implementation consistent with the principles of the present invention. The call processing operations begin when a caller dials or enters a telephone number for sending a message to a subscriber. The caller dials a telephone number corresponding to ADSI server 1400 or corresponding to the subscriber's telecommunications equipment. When the caller dials the telephone number of the subscriber's telecommunications equipment, the subscriber's telecommunications equipment relays the call to ADSI server 1400 by conventional mechanisms when the subscriber is unavailable to receive the call.

The caller interacts with ADSI server 1400 to identify the subscriber to which the caller desires to send a message. The caller then sends the message in a format dependent upon the type of telecommunications equipment the caller uses to send the message. Interface 3100 in ADSI server 1400 receives the message from the caller in the caller format [step 6100].

Interface 3100 determines the type of telecommunications equipment the caller uses from the type of signal received with the message [step 6200]. Based on the caller's telecommunications equipment type, interface 3100 sends the message to the appropriate translator within ADSI translator 3200. For example, if interface 3100 determines that the caller is using a facsimile machine, interface 3100 sends the message to fax graphics translator 5200 (FIG. 5) within ADSI translator 3200.

Controller 5220 within fax graphics translator 5200 analyzes the message to detect information regarding the caller from the message signal, as described above [step 6300]. Controller 5220 then either queues the message until a fax graphics translation unit 5250 becomes available or selects an available fax graphics translation unit to translate the message.

Eventually, one of the fax graphics translation units 5250 translates the message to ADSI text format [step 6400]. Controller 5220 appends the caller information to the translated message and generates an ADSI text message from the translated message [step 6500]. Controller 5220 then sends the ADSI text message to interface 3100.

Interface 3100 routes the ADSI text message to the appropriate subscriber over the PSTN [step 6600]. For example, interface 3100 might accomplish the routing by dialing the telephone number associated with the subscriber's ADSI telephone 1100 (FIG. 1), and attaching a suppressed ringing signal. In this way, interface 3100 transfers the message to ADSI telephone 1100 without any ringing tone to notify the subscriber audibly.

ADSI server 1400 might also permit callers to attach priority status to their messages, or permit subscribers to prioritize messages by designating messages from particular callers as high priority messages. In such a case, ADSI server 1400 might attach suppressed ringing signals to low priority messages transferred to the subscriber's telecommunications equipment. For high priority messages, however, ADSI server 1400 might send the messages without attaching suppressed ringing signals so that the subscriber can be notified immediately of the transferred high priority messages.

Figure 7:
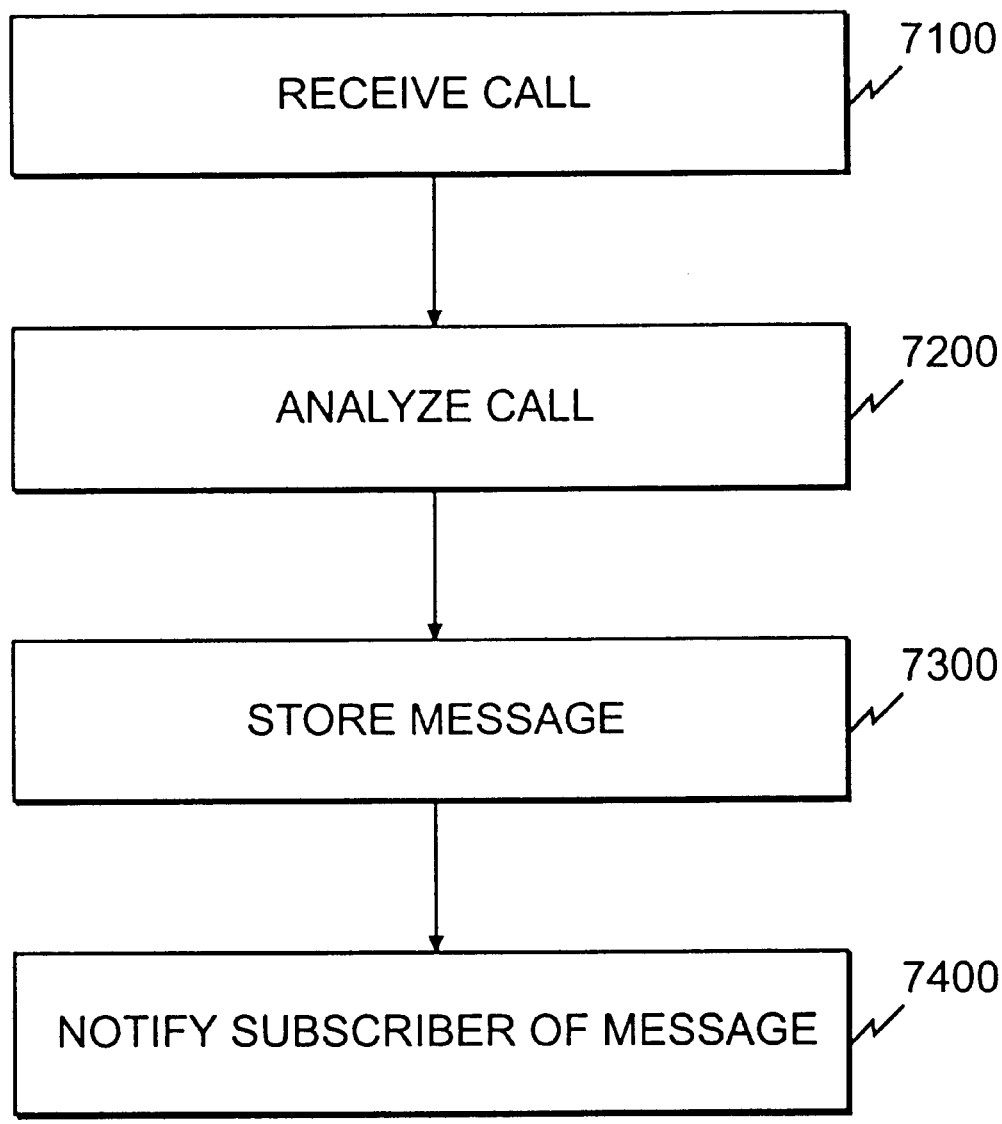
FIG. 7 is a flowchart of call processing operations occurring at the subscriber's telecommunications equipment in an implementation consistent with the principles of the present invention.

FIG. 7 is a flowchart of call processing operations occurring at the subscriber's telecommunications equipment in an implementation consistent with the principles of the present invention. When a call is received by ADSI telephone 1100 (FIG. 2) [step 7100], processor 2100 analyzes data accompanying the call to determine the presence of a suppressed ringing signal [step 7200]. Processor 2100 might use such a determination to distinguish received telephone calls from received text messages.

After the data analysis, processor 2100 stores any message accompanying the call in memory 2200 [step 7300]. If the call is a telephone call, the accompanying message might be the identity of the caller, such as CLID data. Otherwise, the call is a transferred message.

Processor 2100 then notifies the subscriber of the message [step 7400]. Processor 2100 might perform the notification using one of several audio or visual mechanisms, such as by turning on or flashing a light, by displaying a message such as "YOU HAVE A MESSAGE" on display 2400, by displaying the message itself, or by presenting an audible ringing tone. For example, based on the data analysis, processor 2100 might find no suppressed ringing signal accompanying the call, and may then notify the subscriber of the incoming call or message with an audible ringing tone.

Processor 2100 executes a simple software program to permit the subscriber to tailor the handling of messages as desired. Using keys 2500, the subscriber might configure the ADSI telephone 1100 to screen particular messages or messages from certain or unrecognized parties, or to forward particular messages to another location. The subscriber might also configure ADSI telephone 1100 to provide a particular type of message notification, such as a ringing tone, a visual display, or no notification at all.

While one implementation consistent with the principles of the present invention has described the subscriber telecommunications equipment as an ADSI telephone and the network server as an ADSI server, this need not be the case. In other implementations consistent with the principles of the present invention, the subscriber uses different types of telecommunications equipment capable of receiving text messages. For example, the subscriber equipment may be a GSM mobile unit. In this case, the communications network would include a GSM mobile server that would translate messages from the different caller formats to SMS messages for transmission to the GSM mobile unit.

In still other implementations, the subscriber equipment may include an Internet terminal or a facsimile machine. In these cases, the communications network, consistent with the principles of the present invention, would include an Internet server or a fax server to translate messages from the different caller formats to email or fax graphics messages, respectively, for transmission to the Internet terminal or the facsimile machine.

In yet another implementation, the subscriber equipment might include a combination of one or more of the previously described telecommunications equipment. In this case, the communications network would include a server resembling the universal mailbox described in copending application Ser. No. 08/841,516. The universal mailbox would record subscriber profile data that identifies the type of telecommunications equipment used by the subscriber. Using the subscriber profile data, the universal mailbox would translate messages from the different caller formats to a format compatible with the type of telecommunications equipment used by the subscriber, as identified by the subscriber's profile data.

In any of the implementations described above, call processing at the respective server and at the subscriber's telecommunications equipment would be similar to the call processing operations described above with respect to FIGS. 6 and 7.

Systems and methods consistent with the principles of the present invention automatically transfer messages to a subscriber's telecommunications equipment in a format compatible with that equipment without requiring the subscriber to initiate the process.

The foregoing description of preferred embodiments of the present invention provides illustrations and descriptions, but is not intended to be exhaustive nor limit the invention to the precise form disclosed. Modifications and variations are possible in light of the above teachings or may be acquired from practice of the invention. The scope of the invention is defined by the claims and their equivalents.

For example, the systems and methods consistent with the principles of the present invention have been described as including a server that automatically transfers messages to subscriber equipment. These systems and methods are equally applicable to subscriber equipment that automatically retrieves messages from a server without the aid of the subscriber. Such subscriber equipment would periodically call the server to retrieve messages pending for the subscriber, and would retrieve these messages without intervention by the subscriber. In this case, a universal mailbox similar to the one described in copending application, Ser. No. 08/841,516, would be desirable as the server.

What is claimed is:

1. A server in a telecommunications network comprising:
   means for receiving information intended for a subscriber from a caller in a caller format;
   means for translating the information to a subscriber format compatible with equipment of the subscriber; and
   means for automatically transferring the translated information to the subscriber equipment independent of any action by the subscriber, wherein the transferring means includes means for sending suppressed signals with the translated information to the subscriber equipment.

2. The server of claim 1, wherein the receiving means includes:
   means for detecting signals from the caller, and
   means for determining the caller format from the detected signals.

3. The server of claim 1, wherein the receiving means includes:
   means for detecting caller data, and
   means for identifying the caller based on the detected caller data.

4. The server of claim 3, wherein the translating means includes:
   means for generating a subscriber message from the detected caller data and the translated information.

5. The server of claim 4, wherein the transferring means includes:
   means for transmitting the subscriber message for display on the subscriber equipment.

6. The server of claim 1, wherein the receiving means includes:
   means for prioritizing the received information; and
   wherein the transferring means further includes:
      means for transmitting suppressed ringing signals to the subscriber equipment when the prioritizing means prioritizes the received information as a predetermined type of priority information.

7. The server of claim 1, further comprising:
   means for storing subscriber profile data indicating a type of the subscriber equipment.

8. The server of claim 7, wherein the translating means includes:
   means for translating the information to a subscriber format compatible with the subscriber equipment type indicated in the stored subscriber profile data.

9. A server in a telecommunications network comprising:
   means for receiving information intended for a subscriber from a caller in a caller format;
   means for translating the information to a subscriber format compatible with equipment of the subscriber; and
   means for automatically transferring the translated information to the subscriber equipment independent of any action by the subscriber, wherein the transferring means includes:
      means for receiving periodic polling requests from the subscriber equipment, and
      means for sending the translated information to the subscriber equipment in response to the polling requests.

10. A method for automatically transferring information to subscriber equipment, comprising the steps of:
    receiving information intended for a subscriber from a caller in a caller format;
    translating the information to a subscriber format compatible with the subscriber equipment; and
    automatically transferring the translated information to the subscriber equipment independent of any action by the subscriber, wherein the transferring step includes sending suppressed ringing signals with the translated information to the subscriber equipment.

11. The method of claim 10, wherein the receiving step includes the substeps of:
    detecting signals from the caller, and
    determining the caller format from the detected signals.

12. The method of claim 10, wherein the receiving step includes the substeps of:
    detecting caller data, and
    identifying the caller based on the detected caller data.
13. The method of claim 12, wherein the translating step includes the substep of:
    generating a subscriber message from the detected caller data and the translated information.
14. The method of claim 13, wherein the transferring step includes the substep of:
    transmitting the subscriber message for display on the subscriber equipment.
15. The method of claim 10, wherein the receiving step includes the substep of:
    prioritizing the received information; and wherein the transferring step further includes the substep of:
        transmitting suppressed ringing signals to the subscriber equipment when the received information is prioritized as a predetermined type of priority information.
16. The method of claim 10, further comprising the step of:
    storing subscriber profile data indicating a type of the subscriber equipment.
17. The method of claim 16, wherein the translating step includes the substep of:
    translating the information to a subscriber format compatible with the subscriber equipment type indicated in the stored subscriber profile data.
18. A method for automatically transferring information to subscriber equipment, comprising the steps of:
    receiving information intended for a subscriber from a caller in a caller format;
    translating the information to a subscriber format compatible with the subscriber equipment; and
    automatically transferring the translated information to the subscriber equipment independent of any action by the subscriber, wherein the transferring step includes the substeps of:
        receiving periodic polling requests from the subscriber equipment, and
        sending the translated information to the subscriber equipment in response to the polling requests.
19. A network comprising:
    subscriber equipment of at least one type;
    caller equipment of several types;
    a communications medium connecting the subscriber equipment and the caller equipment; and
    a server connected to the communications medium to receive messages from the caller equipment and to send the messages to the subscriber equipment, the server comprising:
        means for receiving the messages from the caller equipment in caller formats,
        means for translating the received messages to a subscriber format compatible with the subscriber equipment, and
        means for automatically transferring the translated messages to the subscriber equipment independent of prior action by a user of the subscriber equipment, wherein the transferring means includes means for sending suppressed ringing signals with the translated messages to the subscriber equipment.
20. The network of claim 19, wherein the receiving means includes:
    means for detecting signals from the caller equipment, and
    means for determining the caller formats from the detected signals.
21. The network of claim 19, wherein the receiving means includes:
    means for detecting caller data, and
    means for identifying callers based on the detected caller data.
22. The network of claim 21, wherein the translating means includes:
    means for generating subscriber messages from the detected caller data and the translated messages.
23. The network of claim 22, wherein the transferring means includes:
    means for transmitting the subscriber messages for display on the subscriber equipment.
24. The network of claim 19, wherein the receiving means includes:
    means for prioritizing the received messages; and wherein the transferring means further includes:
        means for transmitting suppressed ringing signals to the subscriber equipment when the prioritizing means prioritizes the received messages as predetermined types of priority messages.
25. The network of claim 19, wherein the server further comprises:
    means for storing subscriber profile data indicating a type of the subscriber equipment.
26. The network of claim 25, wherein the translating means includes:
    means for translating the messages to a subscriber format compatible with the subscriber equipment type indicated in the stored subscriber profile data.
27. The network of claim 19, wherein the subscriber equipment includes:
    means for receiving the messages transferred from the server,
    means for processing the messages,
    means for storing the messages, and
    means for notifying the user of the subscriber equipment of the stored messages.
28. The network of claim 27, wherein the processing means includes:
    means for determining message types of the received messages; and wherein the storing means includes:
        means for storing notification preference data indicating notification techniques desired by the user for the different message types of the received messages.
29. The network of claim 28, wherein the notifying means includes:
    means for notifying the user, using the stored notification techniques, based on the determined message types.
30. A network comprising:
    subscriber equipment of at least one type;
    caller equipment of several types;
    a communications medium connecting the subscriber equipment and the caller equipment; and
    a server connected to the communications medium to receive messages from the caller equipment and to send the messages to the subscriber equipment, the server comprising:
        means for receiving the messages from the caller equipment in caller formats,
        means for translating the received messages to a subscriber format compatible with the subscriber equipment,
        means for automatically transferring the translated messages to the subscriber equipment independent of prior action by a user of the subscriber equipment, and wherein the subscriber equipment includes:
means for periodically transmitting polling requests to the server; and wherein the transferring means includes:
means for sending the translated messages in response to the polling requests.

31. A method for transmitting messages from caller equipment of several types to subscriber equipment of at least one type via a network server, comprising the steps of:
receiving messages from the caller equipment in caller formats at the network server;
translating the received messages to a subscriber format compatible with the subscriber equipment;
automatically transferring the translated messages to the subscriber equipment independent of prior action by a user of the subscriber equipment, wherein the transferring step includes sending suppressed ringing signals with the translated messages to the subscriber equipment;
receiving the messages transferred from the network server at the subscriber equipment; and
notifying the user of the subscriber equipment of the receiving messages.

32. The method of claim 31, wherein the receiving step at the network server includes the substeps of:
detecting signals from the caller equipment, and
determining the caller formats from the detected signals.

33. The method of claim 31, wherein the receiving step at the network server includes the substeps of:
detecting caller data, and
identifying callers based on the detected caller data.

34. The method of claim 33, wherein the translating step includes the substep of:
generating subscriber messages from the detected caller data and the translated messages.

35. The method of claim 31, wherein the receiving step at the network server includes the substep of:
prioritizing the received messages; and wherein the transferring step further includes the substep of:
transmitting suppressed ringing signals to the subscriber equipment when the received messages are prioritized as predetermined types of priority messages.

36. The method of claim 31, further comprising the step of:
storing in the network server subscriber profile data indicating a type of the subscriber equipment.

37. The method of claim 36, wherein the translating step includes the substep of:
translating the messages to a subscriber format compatible with the subscriber equipment type indicated in the stored subscriber profile data.

38. The method of claim 31, wherein the receiving step at the subscriber equipment includes the substep of:
determining message types of the received messages; and wherein the method further comprises the step of:
storing in the subscriber equipment notification preference data indicating notification techniques desired by the user for the different message types of the received messages.

39. The method of claim 38, wherein the notifying step includes the substep of:
notifying the user, using the stored notification techniques, based on the determined message types.

40. A method for transmitting messages from caller equipment of several types to subscriber equipment of at least one type via a network server, comprising the steps of:
receiving messages from the caller equipment in caller formats at the network server;
translating the received messages to a subscriber format compatible with the subscriber equipment;
automatically transferring the translated messages to the subscriber equipment independent of prior action by a user of the subscriber equipment, wherein the transferring step includes the substeps of:
receiving periodic polling requests from the subscriber equipment, and
sending the translated messages in response to the polling requests;
receiving the messages transferred from the network server at the subscriber equipment; and
notifying the user of the subscriber equipment of the received messages.

41. A server that automatically routes messages from caller equipment to subscriber equipment in a communications network, comprising:
an interface connected to the communications network to receive the messages from the caller equipment, and to detect caller formats of the received messages; and
a translator connected to the interface to translate the received messages from the detected caller formats to a subscriber format compatible with the subscriber equipment, and to instruct the interface to route the translated messages to the subscriber equipment via the communications network independent of prior action by a user of the subscriber equipment, wherein the translator sends suppressed ringing signals with the translated information to the subscriber equipment.

42. A network comprising:
subscriber equipment of various types;
caller equipment of various types;
a communications medium connecting the subscriber equipment and the caller equipment; and
a server connected to the communications medium to receive messages from the caller equipment and to send the messages to the subscriber equipment, the server comprising:
an interface connected to the communications medium to receive the messages from the caller equipment, and to detect caller formats of the received messages,
a memory storing profile data indicating the subscriber equipment type corresponding to a particular subscriber, and
a translator connected to the interface and the memory to translate the received messages from the detected caller formats to subscriber formats compatible with the subscriber equipment type indicated by the stored profile data, and to instruct the interface to automatically route the translated messages to the subscriber equipment via the communications medium independent of prior action by a user of the subscriber equipment, wherein the translator sends suppressed ringing signals with the translated information to the subscriber equipment.

* * * * *